United States Patent
Huth

(10) Patent No.: US 9,082,022 B2
(45) Date of Patent: Jul. 14, 2015

(54) METHOD AND DEVICE FOR ROAD SIGN RECOGNITION

(71) Applicant: GM Global Technology Operations LLC, Detroit, MI (US)

(72) Inventor: Johannes Huth, Trebur (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 14/087,008

(22) Filed: Nov. 22, 2013

(65) Prior Publication Data

US 2014/0193033 A1 Jul. 10, 2014

(30) Foreign Application Priority Data

Nov. 26, 2012 (DE) .......................... 10 2012 023 022

(51) Int. Cl.
*G06K 9/00* (2006.01)
*G08G 1/07* (2006.01)

(52) U.S. Cl.
CPC .................................. *G06K 9/00818* (2013.01)

(58) Field of Classification Search
CPC .................................. G06K 9/00; G01C 21/00
USPC .......... 382/103, 104; 340/906, 907, 910, 919; 701/425
See application file for complete search history.

(56) References Cited

U.S. PATENT DOCUMENTS

| 6,801,638 B1 * | 10/2004 | Janssen et al. ................. 382/104 |
| 2004/0086153 A1 | 5/2004 | Tsai et al. |
| 2012/0128210 A1 | 5/2012 | Zobel |

OTHER PUBLICATIONS

German Patent Office, German Patent Search Report for Application No. 102012023022.2, dated Aug. 29, 2013.

* cited by examiner

*Primary Examiner* — Abolfazl Tabatabai
(74) *Attorney, Agent, or Firm* — Ingrassia Fisher & Lorenz PC

(57) ABSTRACT

A method and a device are provided for recognizing road signs in image data. The method includes, but is not limited to segmenting an object in the image data that is a road sign for a predefined probability. A text mapped in the segmented image data is identified using a text recognition method, where this text comprises numbers and/or words and/or abbreviations and/or combinations thereof. A probability value is determined for the text being depicted on a road sign and, in case the probability value is smaller than or equal to a predefined threshold value, is selected as a potential road sign. In case the probability value is greater than the predefined threshold value, a classifier is applied to the segmented image data for recognizing the object as an actual road sign.

12 Claims, 2 Drawing Sheets

METHOD AND DEVICE FOR ROAD SIGN RECOGNITION

CROSS-REFERENCE TO RELATED APPLICATION

This application claims priority to German Patent Application No. 10 2012 023 022.2, filed Nov. 26, 2012, which is incorporated herein by reference in its entirety.

TECHNICAL FIELD

The technical field relates to a method and a device for road sign recognition in digital image data of an environment.

BACKGROUND

Road sign recognition in digital image data is typically based on a two-step approach. The first step is determining geometric shapes mapped in the image data, such as circles, rectangles or triangles which could represent road signs. The respective regions in the image data are then typically examined for certain further features using a pictogram classifier, in order to determine an exact type of road sign.

A generic method of this kind is disclosed in the DE 10 2009 048 066 A1. Here a method for road sign recognition is described which analyses and classifies the image data of a sensor in an information processing unit. A first method step, on a basis of the results of an analysis, at least one image section is determined which is very likely to contain an object which is a road sign belonging to a certain class of road sign, and which image section, in a second method step, is sent to a classifier, which on the basis of the selected image section recognizes a road sign of a certain class by means of a learning-based method. A first method step involves identifying a class-specific characteristic in the image section, generating a modified image section having the class-specific characteristic in the image center thereof. The image areas created by moving the class-specific characteristic into the center of the image are filled with suitable pixels, and feeding the modified image section into the classifier.

The problem with the known method is the so-called "false-positive-rate". This indicates the rate at which traffic signs are recognized in the image data, when in reality there are none. For circular traffic signs the known methods are largely sufficient for achieving a good classification rate for a simultaneously low false-positive rate. By contrast, the false-positive rate for rectangular structures mapped in the image data is markedly higher. The main reason for this is that rectangular structures which are not traffic signs are encountered much more frequently in urban environments than round structures. Such structures are typically advertising posters and billboards, menu advertisements etc.

It is therefore at least one object to achieve road sign recognition at a lower false-positive rate. In addition, other objects, desirable features and characteristics will become apparent from the subsequent summary and detailed description, and the appended claims, taken in conjunction with the accompanying drawings and this background.

SUMMARY

A method is provided for recognizing traffic signs in image data. The method comprises segmenting an object in the image data which, for a predefined first probability, is a traffic sign. A second step comprises identifying a text mapped in the segmented image data, containing numbers and/or words and/or abbreviations and/or combinations thereof, using a text-recognizing method. A third step comprises determining a probability value for the identified text being depicted on a (random) road sign. In a fourth step, provided the probability value is smaller than or equal to a predefined threshold value, the object is selected or discarded as a potential road sign. In a fifth step, provided the probability value is greater than the predefined threshold value, a classifier is applied to the segmented image data in order to recognize the object as an actual road sign.

The method could also be performed using the alternative steps of: determining a probability value for the identified text not being on a road sign, in case the probability value is greater than a predefined threshold value, selecting or discarding the object as a potential road sign, and in case the probability value is smaller than or equal to the predefined threshold value, applying a classifier on the segmented image data for recognizing the object as an actual road sign. In the course of the following statements, however, reference is only made to the first alternative.

Prior to segmenting an object in the image data which based on its shape/contour could be a traffic sign for the first probability, and prior to, for example, applying a pictogram-based classifier, to insert further steps for increasing the evidence and thus for lowering the false-positive rate. During this process, using a text recognition method as proposed by the embodiments, a text mapped in the segmented image data is identified, as required, and provided such a text has been recognized, a probability value for the recognized text being depicted on a (random) road sign is determined Preferably, however, the probability value determined refers to the recognized text on a road sign being mapped onto the previously determined shape/contour. Depending on the determined probability value the segmented image data showing the object are either rejected, i.e., discarded as a road sign and not considered any further, or sent to a known classifier, in particular a pictogram-based classifier for unequivocal identification as a certain road sign.

The method permits to significantly reduce the false-positive rate and simultaneously lowers the amount of calculation and the demands on the classifier which is usually pictogram-based, in particular for rectangular road signs. For rectangular road signs, in particular, carry information in the form of text much more frequently than in the form of pictograms. A text recognition method can thus examine the segmented image data for text characters. The text recognition method is preferably able to recognize different fonts/text types.

The term "segmenting" is well known in image data processing and is understood by specialists in the field. Preferably segmenting is carried out in the first step using an edge-based and/or region-based segmenting method.

The term "text recognition method" is used here meaning an OCR method (OCR=optical character recognition) or especially preferably ICR method (ICR=intelligent character recognition) or IWR method (IWR=intelligent word recognition). Whilst the OCR method is typically used for merely recognizing individual text characters, the text recognized by an ICR or IWR method is compared with a text data base, thereby permitting improved text recognition including the recognition of different fonts.

When determining the probability value for a text being depicted on a road sign, it is preferred if the identified text is compared with a data base. This data base contains text, for example, which may be depicted on road signs, or text which cannot be depicted on a road sign, or a mixture of the two. In such a data base, each text stored therein is associated with a retrievable probability value which indicates the probability that the identified text is shown on the road sign. Thus the data base may contain text such as "New today", "special offer", "menu", and "super cheap." Each of these texts has a probability value of 0 (zero) assigned to it. Furthermore the data base may contain text such as "100 m", 200 m", "km/h", "Stop" or "end of town." Each of these texts has a very high probability value (near or equal 1) assigned to it, since such a text is very likely to be depicted on a road sign. Naturally, there exists a multitude of texts which may appear on both a road signs (in particular for identifying towns, traffic route signs, etc.) and on other objects that do not represent road signs. Such text in the data base would have respective probability values between 0 and 1 assigned to them.

A further indication for the fact that a text could be depicted on a road sign and thus would have a higher probability value assigned to it is, for example, a uniform typeface and/or a short text length. An expert has easy access to font attributes, which are a further indication for the fact that a text could be depicted or could not be depicted on a road sign. These further indications and attributes are preferably taken into account when specifying the respective probability value.

Preferably the first probability is based on a predefined desired match of the outer contour of the object mapped in the image data with a rectangular, circular or triangular shape of known road signs. The desired match defines for example acceptable possible deviations when registering the object with, for example, a predefined outer contour of a road sign. These deviations possibly arise from optical effects when recording the image data, for example when a road sign is mapped in the image data not straight from the front, but at an angle. If the shape/contour of the segmented object corresponds to the shape of a road sign, then in particular the proportions of the edge lengths of the object and of the road sign are approximately equal. Furthermore, preferably the first probability is based on a predefined desired match of the colors of the object mapped in the segmented image data with colors of known road signs. In this case preferably, possible color combinations and area percentages for each color for road signs are predefined and compared with the segmented image data in which the object is mapped. The object may deviate from these defaults only by predefined deviations in order to be recognized as an object which is a road sign with the first probability.

Preferably, if in the second step no text is recognized in the segmented image data, a classifier is applied to the segmented image data for recognizing the object as an actual road sign. In the fifth step a classification of the object is then carried out, as known in the state of the art.

One device-related aspect of the requirement is met by a device for recognizing road signs in image data and for performing an above-described method according to the invention. The device comprises: a segmenting device with which an object is segmented in the image data that is a road sign for a predefined first probability, a text recognition device text recognition device, with which a text recognition method, text mapped in the segmented image data and comprising numbers and/or words and/or abbreviations and/or combinations thereof is identified, a probability determining device, with which a probability value is determined for the identified text being depicted on a road sign, a selecting device, with which in case the probability value is smaller than or equal to a predefined threshold value, the object is selected as a potential traffic sign, and a classifier device classifier device, with which in case the probability value is greater than the predefined threshold value, a classifier is applied to the segmented image data for recognizing the object as an actual road sign.

As already explained above the requirement is also met by a device which alternatively comprises a probability determining device for determining a probability value for the identified text being depicted on a road sign, a selecting device for selecting the object as being a potential road sign in case the probability value is greater than a predefined threshold value, and a classifier device for applying a classifier to the segmented image data for recognizing the object as an actual road sign in case the probability value is smaller than or equal to the predefined threshold value.

Further advantageous embodiments and advantages of the device analogously result from the above statements made in conjunction with the method. A motor vehicle is provided with an above-described device.

Finally a computer program suitable is provided for performing the method is a program that comprises program code for performing the steps the method, when the program is executed on a computer. The computer program can be read into already existing control units using simple devices, and can be used to conduct a respectively proposed road sign recognition. Provision is therefore made for a computer program product with program code stored on a computer-readable medium in order to perform the method when the program product is executed on a computer. The computer program product can be integrated with a control unit as an upgrade option.

BRIEF DESCRIPTION OF THE DRAWINGS

The present invention will hereinafter be described in conjunction with the following drawing figures, where like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
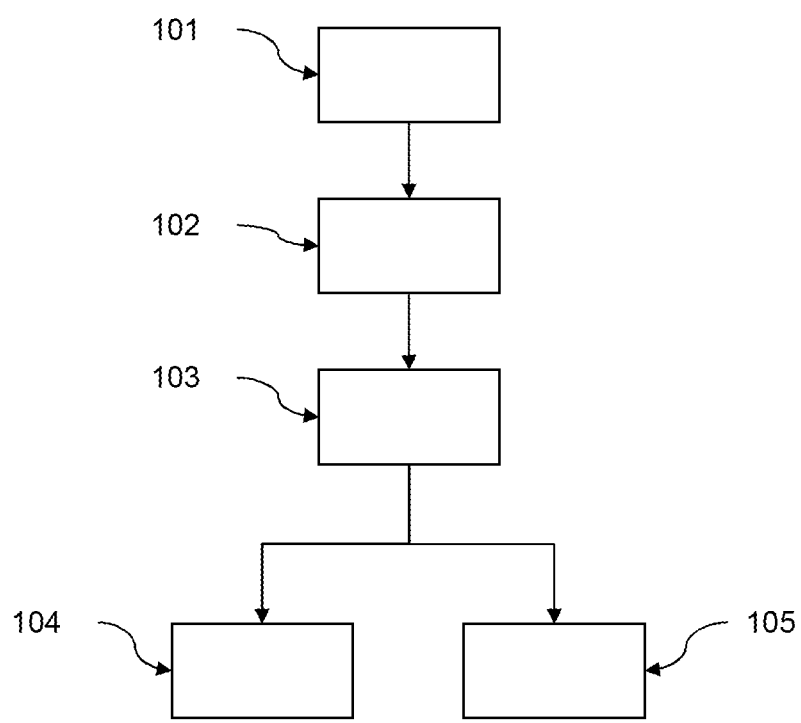
FIG. 1 shows a schematic representation of the method according to an embodiment.

FIG. 1 shows a schematic representation of the method for recognizing road signs in image data. The method comprises the following steps. In a first step 101 an object in the image data is segmented, which for a predefined first probability is a road sign. In a second step 102 a text mapped in the segmented image data comprising numbers and/or words and/or abbreviations and/or combinations thereof is identified using a text recognition method. In a third step 103 a probability value for the identified text being depicted on a (random) road sign is determined. In a fourth step 104, given the case that the probability value is smaller than or equal to a predefined threshold value, the object is selected as a potential road sign. In a fifth step 105, in case the probability value is greater than the predefined threshold value, a classifier is applied to the segmented image data for recognizing the object as an actual road sign.

Figure 2:
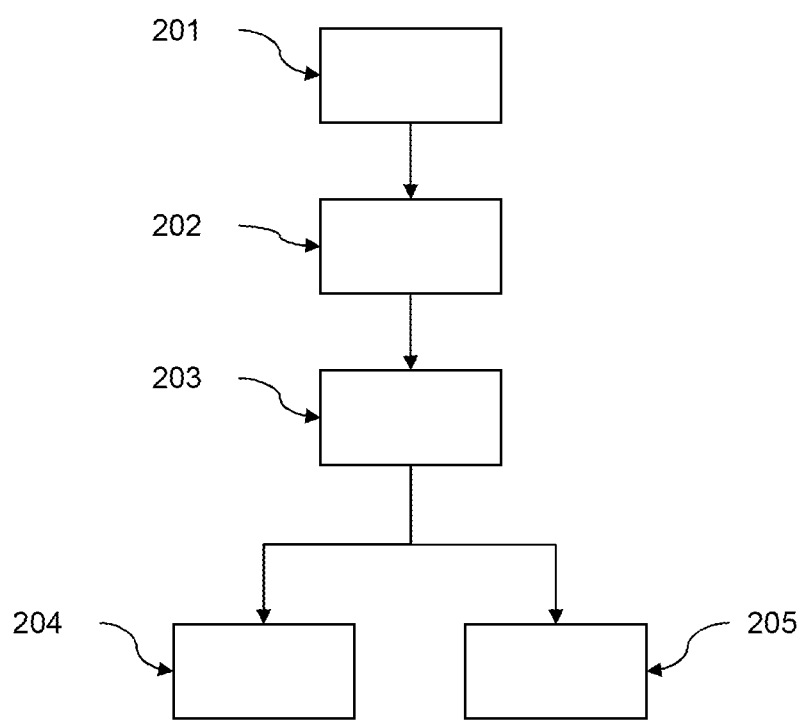
FIG. 2 shows a schematic structure of the device according to an embodiment.

FIG. 2 shows a schematic structure of the device according to an embodiment for recognizing road signs in image data comprising: a segmenting device 201, with which an object is segmented in the image data that is a road sign with a predefined first probability, a text recognition device 202 with which a text recognition method maps text in the segmented image data and comprising numbers and/or words and/or abbreviations and/or combinations thereof is identified, a probability determining device 203, with which a probability value is determined for the identified text being depicted on a road sign, a selecting device 204, with which in case the probability value is smaller than or equal to a predefined threshold value, the object is selected as a potential traffic sign, and a classifier device 205, with which, in case the probability value is greater than the predefined threshold value, a classifier is applied to the segmented image data for recognizing the object as an actual road sign.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for recognizing road signs in image data, comprising:
   segmenting a road sign for a predefined first probability in the image data in a processor;
   identifying a text mapped in the image data after the segmenting using a text recognition method in the processor;
   determining a probability value for the text depicted on the road sign in the processor;
   selecting, in the processor, the road sign as a potential road sign in a first case that the probability value is smaller than or equal to a predefined threshold value; and
   applying, in the processor, a classifier to the image data for recognizing the road sign as an actual road sign in a second case that the probability value is greater than the predefined threshold value;
   wherein the probability value is based on a predefined desired match of an outer contour of the road sign that is mapped in the image data with a shape of a known road sign.

2. The method according to claim 1, wherein the probability value is based on a predefined match of colors of the road sign that is mapped in the image data with colors of a known road sign.

3. The method according to claim 1, wherein the segmenting is performed using an edge based segmenting process.

4. The method according to claim 1, wherein the text recognition method is an OCR method.

5. The method according to claim 1, wherein the classifier is configured for a classification of pictograms.

6. A device for recognizing road signs in image data comprising:
   a segmenting device that is configured to segment a road sign for a predefined first probability in the image data;
   text mapping device that is configured to map text in the image data produced by the segmenting device with a text recognition method;
   a determining device with which a probability value is determined for the text depicted on the road sign;
   a selecting device that is configured to select the road sign as a potential traffic sign if the probability value is smaller than or equal to a predefined threshold value; and
   a classifying device that is applied to the image data produced by the segmenting device for recognizing the road sign as an actual road sign if the probability value is greater than the predefined threshold value;
   wherein the probability value is based on a predefined desired match of an outer contour of the road sign that is mapped in the image data with a shape of a known road sign.

7. The device according to claim 6, wherein the text recognition method is an OCR recognition method.

8. The device according to claim 6, wherein the text comprises a number.

9. The device according to claim 6, wherein the text comprises a word.

10. The device according to claim 6, wherein the text comprises an abbreviation.

11. The device according to claim 7, wherein the text recognition method is an ICR method.

12. The device according to claim 7, wherein the text recognition method is an IWR method.

* * * * *